March 17, 1931.          F. J. HULL                 1,796,930
                     STEERING POST LOCK
             Filed June 21, 1924    2 Sheets-Sheet 1

Witness:                            Inventor:
Jas E Hutchinson                Foster J. Hull,
                            By H H Snelling
                                His Attorneys March 17, 1931. F. J. HULL 1,796,930
STEERING POST LOCK
Filed June 21, 1924 2 Sheets-Sheet 2
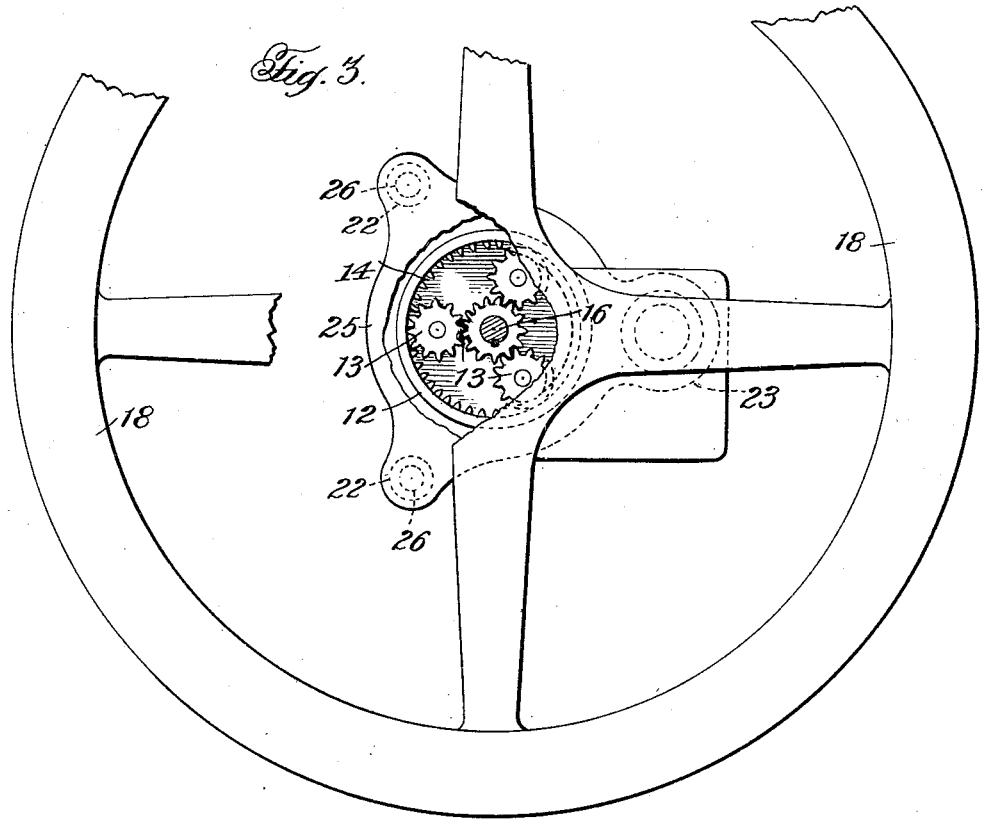
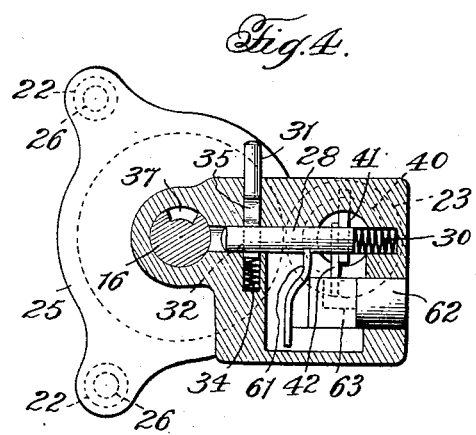

Patented Mar. 17, 1931

1,796,930

UNITED STATES PATENT OFFICE

FOSTER J. HULL, OF HAGERSTOWN, MARYLAND, ASSIGNOR TO FAIRCHILD LOCK CORPORATION, OF NEW YORK, N. Y., A CORPORATION OF DELAWARE

STEERING-POST LOCK

Application filed June 21, 1924. Serial No. 721,522.

This invention relates to a lock for the steering post of an automobile and has for its object the improvement generally of such locks.

An important feature of the present invention is the provision of an automobile lock which will automatically break the ignition circuit.

A further object of the invention is the provision of a lock which is movable as a whole by such movement controlling the ignition circuit.

The underwriters provide two different rates for cars, one where the car is equipped with an ordinary lock, and another, a lower rate, for cars which have, in addition to the usual lock, some means for compelling the owner of the car to use the lock, as the underwriters have found that they have been required to pay for cars which had been stolen while left unlocked, which merely means that the owner of the car was obtaining the benefit of the lock rate without actually using the lock. The general requirement of the underwriters for the lowest rate is that the locking mechanism is so constructed that it must be in the locked or theft-resisting position before it is possible to break the ignition circuit of the automobile, their thought being that an owner would be unwilling to leave his engine running to save himself the trouble of locking the car.

In the drawings:

Figure 3 is a top plan view.

Figure 4 is a vertical section taken along the axis of the main bolt.

Figure 1:
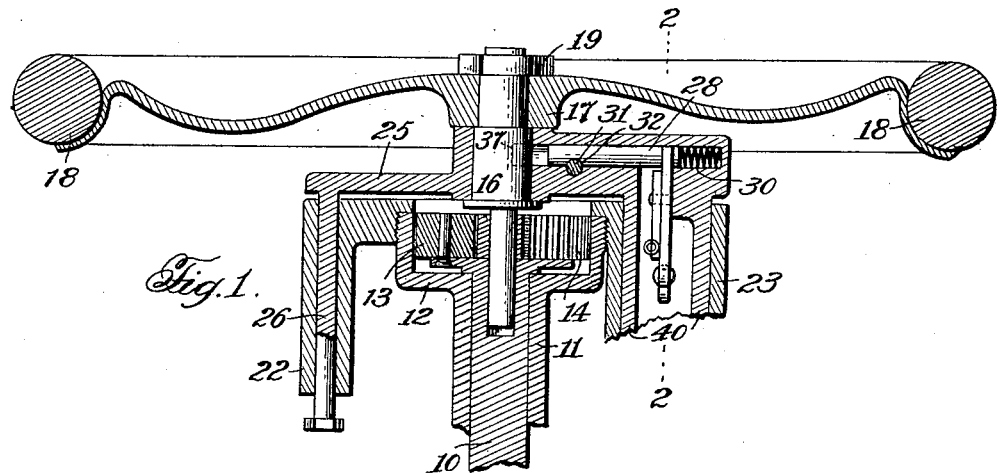
Figure 1 is an elevation largely in cross section through the center of the steering wheel shaft.

The steering post 10 is of the usual type within a casing 11 enlarged at its top to form a bowl 12 for the usual three pinion drive 13, these pinions meshing in the customary manner with the annular rack 14, and with the central pinion on the steering wheel shaft 16 carrying at its top the hub 17 of the steering wheel 18, the hub fitting on a shoulder of the short shaft 16 and located in place thereon by means of the lock nut 19. All the parts so far described are old and well known and no claim is made for them except in combination with the novel features of the invention.

A spider is permanently secured to the steering post casing and carries a plurality of downwardly directed sleeves such as 22 and 23, which serve to guide the bearing plate 25, which carries one or more headed guide rods 26 snugly fitting within the sleeve or sleeves 22, so as to guide the bearing plate 25 in a manner so as to keep its axis constantly co-axial with the axis of the steering post. This mechanism permits the bearing plate to be moved a limited amount in line with the axis of the steering column, but prevents it from being rotated, so that the bearing plate may carry a lock to prevent rotation of the steering post shaft 16 or to render it inoperative to guide the automobile.

In the specific embodiment shown, the plunger or bolt of the lock is illustrated as the cylindrical member 28 lying within a bore, in the closed end of which is a spring 30 constantly urging the bolt 28 into engagement with the shaft 16. A manually controlled push pin 31 moves snugly within a groove 32 of the bolt and prevents its axial movement while the push pin is in such position. The pin, however is movable against the tension of its spring 34 inwardly into such position that the arcuate slot 35 in the push pin will be in registry with the bolt 28, which will therefore be shot forward into contact with the cylindrical surface of the shaft 16, and when such shaft is rotated, this bolt will move into the hole 37 of the shaft 16, which rather snugly fits the bolt 28. Such movement of the bolt positively secures the shaft 16 to the bearing plate 25 and in effect causes the steering wheel 18 and shaft 16 and the central pinion of the steering rod assembly to move as a unit, this movement being limited to an up and down movement by virtue of the engagement of the guide rod 26 with the sleeve 22.

Within the sleeve 23 is a plunger 40 carrying a pair of levers 41 and 42 each mounted on a pivot 43 in the plunger which is movable with the bearing plate 25 and may be integral therewith if desired. The lever 41 has a lower arm terminating in a toe 44, the upper margin 45 of which is beveled, and when the plunger is moved upwardly this beveled surface rides on the upper preferably sloping wall 47 of a slot 48 in the wall of the sleeve 23, the plunger itself being slotted as at 49 to allow the toe to pass into the keeper slot in the sleeve. The lever 41 is held with its toe in the keeper by means of a spring 50 and also by the engagement of the short arm 51 of the lever by the bolt 28 which lies in the path of movement of such short end 51, effectively preventing relative movement of the plunger and sleeve when the bolt is in unlocked position as shown. With the bolt locked, however, the plunger may readily be lifted as only the spring 50, which is relatively weak, prevents such movement. When the plunger is so moved upwardly, the spring pressed pawl end 53 of the lever 42 rides on the teeth of the rack 53, so that while the plunger can be raised it cannot be lowered without in some way disengaging the pawl from these teeth.

Figure 2:
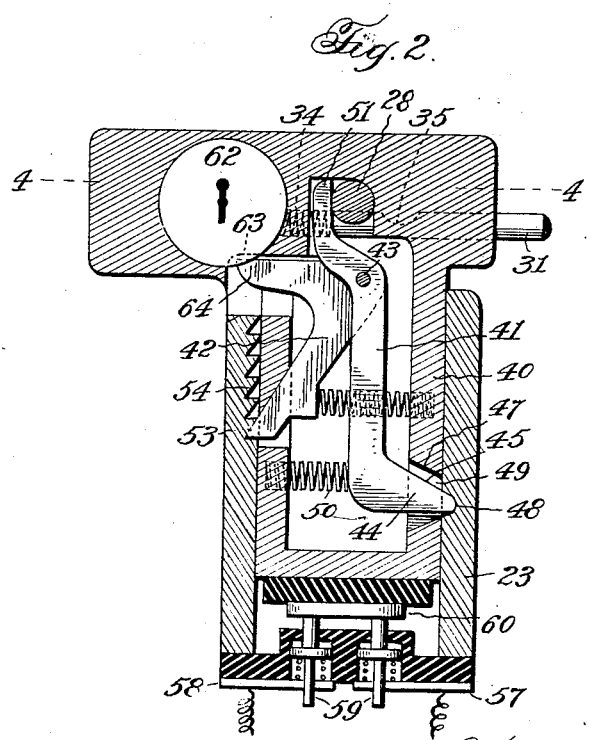
Figure 2 is a section taken on line 2—2 of Figure 1.

The ignition circuit is connected to the contacts 57 and 58, each in electrical connection with a spring pressed pin 59, both engaging a contact member 60 secured to but electrically insulated from the bottom of the plunger 40, this configuration tending to open the circuit when the plunger is raised and to close the ignition circuit when the plunger is lowered to the position shown in Figure 2, and at which time the springs of the pins 59 will be compressed and each of the pins will be in firm engagement with the plate 60.

The operation is as follows: The automobile is brought to a stop and it is desired to shut off the ignition. This cannot be done except by first locking the car, which act is accomplished by pressing in the pin 31, turning the key first, then allowing the bolt to shoot forward so that its rear edge clears the tip 51 of the lever 41. The steering wheel may now be lifted to break the ignition circuit, no key being required for any of the acts just outlined. The driver later returns to the car and desires to close the ignition circuit, and this he does by inserting a key into the plunger type lock indicated at 62, the rotatable cylinder of which carries a cam 61, circular in axial view, which restores the bolt 28 to unlocked position, first accomplishing a rather important result, namely, the face 63 of the recess in the revolving cylinder engages the free end 64 of the lever 42, disengaging the pawl 53 from the teeth of the rack 54, thus allowing the plunger to descend into position where the toe 44 will lock in the keeper slot 48 of the sleeve 23, which is stationary with respect to the steering post casing. The withdrawal of the bolt 28 permits the manually controlled pin 31 to return to normal position by virtue of its spring 34 and the downward movement of the plunger closes the ignition circuit and places the control of the automobile entirely in the hands of the operator.

It will be noted that the cylinder of the lock 62 cannot be rotated completely at one time; the turning of the cylinder first releases the lever 42 from the teeth 54, but before it can be rotated the remainder of the way, the steering wheel must be lowered, closing the ignition circuit, since the end 51 of the lever 41 is in the path of the bolt 28 until the toe 44 is seated in its keeper slot. The movement of the shaft 16 is not sufficient to permit the center pinion to go out of mesh with the three planet pinions, so there is never any difficulty in returning the wheel to normal driving position.

What I claim is:

1. In a device of the character described, a bolt, a spring for urging said bolt in one direction, means for moving said bolt in the opposite direction, a support for said means and said bolt movable with respect to the stationary parts of the automobile, means carried by said support for making and breaking the ignition circuit upon movement of said support and means for locking said support.

2. In a device of the character described, a steering post casing, a plurality of telescoping members, one of which is carried by said casing, means carried by the other of said members for locking a movable part of the steering post assembly, and means also carried by said last mentioned telescoping member for making and breaking the ignition circuit.

3. In a device of the character described, a stationary part of an automobile, a member mounted for reciprocating movement in said stationary part, an ignition circuit make and break mechanism carried in part by said stationary part of the automobile and in part by said movable member, and a bolt and lock assembly carried by said movable member.

4. In a device of the character described, a steering post casing, a plurality of guide sleeves secured to said casing, a plurality of guide rods slidable in said sleeves, a bearing plate secured to said guide rods so as to be movable in a direction parallel with the axis of said casing, a bolt in said bearing plate for locking the steering post shaft to the bearing plate, and means within one of said sleeves for making and breaking the ignition circuit.

5. In a device of the character described, a steering post casing, a plurality of guide sleeves secured to said casing, a plurality of guide rods slidable in said sleeves, a bearing plate secured to said guide rods so as to be movable in a direction parallel with the axis of said casing, a bolt in said bearing plate for locking the steering post shaft to the bearing plate, and means within one of said sleeves for making and breaking the ignition circuit, and means for preventing relative movement of said guide rods and said guide sleeves until said bolt is in locking position.

6. In a device of the character described, a spring pressed bolt, a housing for said bolt, a plunger movable with said housing, a make and break contact mounted on said plunger for controlling the ignition circuit, means for preventing movement of said plunger to break the ignition circuit until said bolt is in locking position.

7. In a device of the character described, a spring pressed bolt, a housing for said bolt, a plunger movable with said housing, a make and break contact mounted on said plunger for controlling the ignition circuit, means for preventing movement of said plunger to break the ignition circuit until said bolt is in locking position, and means for retaining said plunger in ignition breaking position.

8. In a device of the character described, a steering post casing having an internal gear therein, a plurality of pinions meshing with said internal gear, and a central pinion meshing with each of the pinions before mentioned, a housing, means for locking together said housing and said central pinion, and means movable with said housing and said central pinion for making and breaking the ignition circuit upon movement of said central pinion and said housing.

9. The combination with a stationary part of an automobile, of a member having limited movement with respect to said stationary part, a locking device carried thereby, a rotatable shaft to be locked by said device and an ignition circuit make and break mechanism carried in part by said member, and in part by a relatively stationary portion of the automobile.

10. In a device of the character described, a steering post casing having an internal gear therein, a plurality of pinions meshing with said internal gear, a central pinion meshing with each of said plurality of pinions, a housing, locking means within said housing, means for guiding said housing and said locking means so as to cause said central pinion to move in the direction of its axis, means for limiting said movement to prevent said central pinion passing out of mesh with said plurality of pinions, and means movable with said housing for making and breaking the ignition circuit.

11. In a steering post lock, a steering post casing, a steering wheel shaft movable axially with respect to said casing, a member surrounding a portion of said steering wheel shaft and movable axially therewith, means for locking together said member and said steering wheel to prevent relative rotation, and means for preventing axial movement of the steering wheel shaft when at one limit of its travel until the locking means securing together said member and said shaft is released.

12. In a steering post lock, a steering post casing, a steering wheel movable axially with respect to said casing, a member surrounding a portion of said steering wheel and movable axially therewith, means for locking together said member and said steering wheel and means for preventing axial movement of the steering wheel when at one limit of its travel until said member and said steering wheel are locked together.

13. In a steering post lock, a steering post casing, a steering wheel movable axially with respect to said casing, a member surrounding a portion of said steering wheel and movable axially therewith, means for locking together said member and said steering wheel and means for preventing axial movement of the steering wheel when at one limit of its travel until said member and said steering wheel are locked together, and for preventing axial movement of said steering wheel when at the other limit of its axial movement until said steering wheel is unlocked from said member.

14. In a steering post lock, a plurality of telescoping members one of which is mounted relatively stationary to the automobile frame, an ignition make and break circuit carried in part by each of said telescoping members, a plurality of independently movable spring-pressed levers, one preventing relative movement of the telescoping members in one direction and the other preventing relative movement of the members in the other direction and a steering post locking mechanism operating both of said members.

15. In a device of the character described, a steering wheel assembly including a steering post casing and a steering wheel rotatably and axially movable relatively thereto, means axially movable with respect to said steering post casing and held against rotation with respect to said casing, an ignition circuit contact carried by said means, mechanism yieldingly permitting axial movement of said means in one direction relatively to said casing and preventing return movement, and steering post locking mechanism for rendering inoperative said mechanism whereby the steering wheel may be moved to normal driving position and the ignition circuit simultaneously closed.

16. In a device of the character described, a steering post, a member axially movable with respect to the steering post, an ignition circuit contact carried by said member, a bolt adapted to engage the shaft of the steering wheel to prevent rotative movement thereof, and a mechanism lying in the path of said bolt when the latter is in locking position to prevent movement of said contact to circuit closing position.

17. In a device of the character described, a steering post, a housing movable axially with respect to the steering post, a steering wheel shaft rotatably mounted in said housing, a sliding member for locking said shaft and said housing against relative rotation, a cylinder lock assembly for withdrawing said sliding member, a pivoted lever preventing axial movement of said housing with respect to the steering post when the latter is at one limit of its travel and means carried by the locking cylinder for rendering inoperative said pivoted lever.

18. In a device of the character described, a casing fixedly mounted with respect to the automobile frame and having a slot in an inner wall thereof, a plunger slidably mounted in said casing and having a slot in alinement with the slot of said casing, a member pivoted in said plunger and having an extending portion adapted to enter both of said alined slots, and a bolt, when in unlocked position, lying in the path of one end of said pivoted member to prevent removal of its projecting portion from either of said slots.

19. In an automobile, an axially movable steering wheel, a steering post therefor, an ignition system, locking means for preventing angular movement of the steering post with respect to the vehicle, means for breaking the ignition circuit upon axial movement of the steering wheel and for preventing the closing of the ignition circuit until after the locking means is moved to unlocked position.

20. In a steering post lock for automobiles, a pair of members having relative movement, an ignition circuit make and break mechanism operated by such relative movement, means for locking the two members in one position, and other means for locking the two members in another position.

21. In an automobile locking device, a bolt, a spring urging the bolt to locking position, a trigger for releasing the bolt so that it may move under urge of its spring to locking position, means preventing movement of the bolt to unlocking position and key operated means holding the bolt against movement by its spring but operable when the trigger is held released to advance the bolt slowly to locking position.

22. In a coincidental lock, a locking bolt, means for moving the bolt to locking position, independent means for moving the locking bolt from locked position, a switch controlling the ignition circuit, a lever held by the locking bolt when the parts are in running position to lock the ignition switch against opening.

23. In a coincidental lock, a spring pressed locking bolt, a key operated lock having a cam secured thereto, said cam being circular in axial view and serving to withdraw the bolt from locking position against the urge of the locking bolt spring, and means controlled by the position of the bolt for locking the ignition circuit closed when the bolt is in locking position.

24. In a device of the character described, a plunger, an ignition circuit adapted to be closed by movement of the plunger, means for locking the plunger to a relatively stationary part of the automobile when the ignition circuit is closed and a manually released member serving until released to hold the locking member in position to prevent movement of the plunger thereby preventing a breaking of the ignition circuit.

25. In a coincidental lock for an automobile of the type in which the steering wheel has movement relative to the steering post, an ignition circuit, a switch for making and breaking said circuit, a locking bolt for rendering the steering wheel inoperative for turning the steering post, a member serving in one position to lock the switch to hold the ignition circuit closed, the path of the bolt being such that when the bolt is in inoperative position so that the steering wheel controls the steering post, said member is held in locked position but is released from such locking position upon movement of the bolt to a position in which the steering wheel is rendered inoperative.

26. In an automobile locking device, a spring pressed bolt, a trigger for holding the bolt against movement in one direction but movable to permit such movement, and key operated means the axis of which is parallel to the axis of the bolt for holding the bolt in one position independent of the trigger and for moving the bolt in opposite direction.

27. In an automobile locking device, a bolt, a spring urging the bolt to locking position, a trigger normally holding the bolt against movement to locking position but manually operable to release the bolt so that it may move under urge of its spring into locking position, and key operated means the axis of which is parallel to the axis of the bolt, said key operated means holding the bolt against movement by its spring to locking position when the parts are in running position, being operable with the trigger to advance the bolt to locking position and operable independently of the trigger to permit the bolt being released by the trigger alone after completion of the operation of the key operated means.

FOSTER J. HULL.